United States Patent
Wang et al.

(10) Patent No.: US 10,164,678 B2
(45) Date of Patent: Dec. 25, 2018

(54) ELECTRONIC PRODUCT PROTECTIVE CASE

(71) Applicant: Huawei Technologies Co., Ltd., Shenzhen (CN)

(72) Inventors: Xiaokun Wang, Wuhan (CN); Wujian Liu, Wuhan (CN); Yanbiao Luo, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/560,409

(22) PCT Filed: Jun. 5, 2015

(86) PCT No.: PCT/CN2015/080895
§ 371 (c)(1),
(2) Date: Sep. 21, 2017

(87) PCT Pub. No.: WO2016/192104
PCT Pub. Date: Dec. 8, 2016

(65) Prior Publication Data
US 2018/0062688 A1    Mar. 1, 2018

(51) Int. Cl.
*H04B 1/3888* (2015.01)
*A45C 11/24* (2006.01)
(Continued)

(52) U.S. Cl.
CPC ............ *H04B 1/3888* (2013.01); *A45C 11/00* (2013.01); *A45C 11/24* (2013.01);
(Continued)

(58) Field of Classification Search
CPC ........................... H04B 1/3888; H04B 1/3877
See application file for complete search history.

(56) References Cited

U.S. PATENT DOCUMENTS

2009/0289749 A1    11/2009  Fullerton et al.
2012/0066865 A1    3/2012   Lauder et al.
(Continued)

FOREIGN PATENT DOCUMENTS

CA    2912329 A1    11/2014
CN    102156510 A    8/2011
(Continued)

OTHER PUBLICATIONS

Machine Translation and Abstract of Chinese Publication No. CN104166433, Nov. 26, 2014, 30 pages.
(Continued)

*Primary Examiner* — Tuan H Nguyen
(74) *Attorney, Agent, or Firm* — Conley Rose, P.C.

(57) ABSTRACT

An electronic product protective case includes a rear housing and a holder which further includes a magnet assembly, and the magnet assembly includes a first magnet group and a second magnet group. The first magnet group includes a first magnet and a third magnet that have opposite polarities. The second magnet group includes a second magnet and a fourth magnet that have opposite polarities. The first magnet and the second magnet have opposite polarities. The third magnet and the fourth magnet have opposite polarities. The first magnet and the second magnet are mutually absorbed, and the third magnet and the fourth magnet are mutually absorbed.

11 Claims, 2 Drawing Sheets

(51) Int. Cl.
*H04M 1/02* (2006.01)
*A45C 11/00* (2006.01)
*A45C 13/10* (2006.01)
*H04B 1/3877* (2015.01)
*G06F 1/16* (2006.01)

(52) U.S. Cl.
CPC ........ *A45C 13/1069* (2013.01); *G06F 1/1626* (2013.01); *H04B 1/3877* (2013.01); *H04M 1/02* (2013.01); *H04M 1/026* (2013.01); *A45C 2011/002* (2013.01); *A45C 2011/003* (2013.01); *A45C 2200/15* (2013.01); *G06F 2200/1633* (2013.01)

(56) References Cited

U.S. PATENT DOCUMENTS

| | | | |
|---|---|---|---|
| 2012/0068799 | A1 | 3/2012 | Lauder et al. |
| 2013/0277271 | A1 | 10/2013 | Toulotte |
| 2014/0076748 | A1 | 3/2014 | Padilla |
| 2015/0001105 | A1 | 1/2015 | Nyholm et al. |
| 2015/0380139 | A1 | 12/2015 | Hsu |
| 2016/0028873 | A1* | 1/2016 | Du .................... H04M 1/72527 455/557 |
| 2016/0242226 | A1 | 8/2016 | Fushiki et al. |

FOREIGN PATENT DOCUMENTS

| | | | |
|---|---|---|---|
| CN | 202819990 | U | 3/2013 |
| CN | 202908045 | U | 5/2013 |
| CN | 203522822 | * | 4/2014 .............. H04M 1/02 |
| CN | 203522822 | U | 4/2014 |
| CN | 104166433 | A | 11/2014 |
| CN | 104180131 | A | 12/2014 |
| CN | 204288047 | U | 4/2015 |
| JP | 2009199301 | A | 9/2009 |
| JP | 2014535113 | A | 12/2014 |
| JP | 2015082766 | A | 4/2015 |
| KR | 20120115872 | A | 10/2012 |

OTHER PUBLICATIONS

Machine Translation and Abstract of Chinese Publication No. CN202819990, Mar. 27, 2013, 9 pages.
Machine Translation and Abstract of Chinese Publication No. CN202908045, May 1, 2013, 17 pages.
Machine Translation and Abstract of Chinese Publication No. CN203522822, Apr. 2, 2014, 10 pages.
Machine Translation and Abstract of Chinese Publication No. CN204288047, Apr. 22, 2015, 16 pages.
Foreign Communication From a Counterpart Application, PCT Application No. PCT/CN2015/080895, English Translation of International Search Report dated Feb. 25, 2016, 3 pages.
Foreign Communication From a Counterpart Application, Chinese Application No. 201580063990.6, Chinese Office Action dated May 23, 2018, 6 pages.
Machine Translation and Abstract of Korean Publication No. KR20120115872, Oct. 19, 2012, 8 pages.
Foreign Communication From a Counterpart Application, European Application No. 15893760.7, Extended European Search Report dated Feb. 22, 2018, 8 pages.
Machine Translation and Abstract of Japanese Publication No. JP2009199301, Sep. 3, 2009, 17 pages.
Foreign Communication From a Counterpart Application, Japanese Application No. 2017-543358, Japanese Notice of Reasons for Rejection dated Oct. 23, 2018, 4 pages.
Foreign Communication From a Counterpart Application, Japanese Application No. 2017-543358, English Translation of Japanese Notice of Reasons for Rejection dated Oct. 23, 2018, 7 pages.

\* cited by examiner

ELECTRONIC PRODUCT PROTECTIVE CASE

CROSS-REFERENCE TO RELATED APPLICATION

This application is a U.S. National Stage of International Patent Application No. PCT/CN2015/080895 filed on Jun. 5, 2015, which is hereby incorporated by reference in its entire.

TECHNICAL FIELD

The present disclosure relates to electronic product accessories, and in particular, to an electronic product protective case.

BACKGROUND

As many electronic products such as mobile phones and tablets emerge, leather products matching the electronic products also increase in the market. Many leather products have a holder function. However, when the holder function is not used, user experience is severely affected because a connection between a holder and a rear housing is improperly handled in existing leather products. For example, in a protective case structure of an electronic product in some other approaches, a holder is connected to a rear housing by means of absorbing between a magnet and an iron sheet. The magnet is disposed in the holder, and the iron sheet is disposed in the rear housing. The holder is absorbed to a surface of the rear housing when the holder function is not used. However, the absorbing between the magnet and the iron sheet results in the following disadvantage of the electronic product. The magnet and the iron sheet cause a change to a magnetic field of a location of the electronic product. Therefore, normal working of a magnetic sensitive component in the electronic product is affected, for example, a deviation is caused to an indication of a compass.

SUMMARY

Embodiments of the present disclosure provide an electronic product protective case to resolve the following technical problem. An electronic product protective case causes a disorderly magnet environment in which an electronic product is located, affecting work of a magnetic sensitive component in the electronic product.

The present disclosure provides an electronic product protective case, including a rear housing and a holder, where the rear housing is configured to cover a rear cover of an electronic product, the holder is connected to the rear housing and is configured to cooperate with the rear housing to support the electronic product, where the electronic product protective case further includes a magnet assembly, the magnet assembly includes a first magnet group and a second magnet group, the first magnet group is disposed in the rear housing, the second magnet group is disposed in the holder, the first magnet group includes a first magnet and a third magnet that have opposite polarities, the second magnet group includes a second magnet and a fourth magnet that have opposite polarities, the first magnet and the second magnet have opposite polarities, the third magnet and the fourth magnet have opposite polarities, and the first magnet and the second magnet are mutually absorbed, and the third magnet and the fourth magnet are mutually absorbed such that the holder is absorbed to a surface of the rear housing.

In a first possible implementation, the first magnet and the third magnet are disposed side by side and press against each other, and the second magnet and the fourth magnet are disposed side by side and press against each other.

In a second possible implementation, the first magnet includes a first side and a second side that are adjacent, and the first side is perpendicular to the second side. The third magnet includes a third side and a fourth side that are adjacent, and the third side is perpendicular to the fourth side, and the first magnet and the third magnet are disposed side by side, the first side is opposite to the third side, the second side and the fourth side are extended in a same direction, the second side and the fourth side have an equal length, and a distance between the first side and the third side is less than or equal to the length of the second side.

With reference to the second possible implementation, in a third possible implementation, a difference between magnetic field strength of the first magnet and magnetic field strength of the third magnet is less than or equal to 300 millitesla (mT).

With reference to the third possible implementation, in a fourth possible implementation, the magnetic field strength of the first magnet is equal to the magnetic field strength of the third magnet.

In a fifth possible implementation, the first magnet group is disposed near a central area of the rear housing.

In a sixth possible implementation, the first magnet group is located near an edge of the rear housing, the holder includes a support portion, the support portion includes a connecting side and a support side, the connecting side is connected to the rear housing, the support portion can be opened or closed relative to the rear housing, the support side is disposed opposite to the connecting side, and the second magnet group is located in a location in the support portion near the support side.

With reference to the sixth possible implementation, in a seventh possible implementation, the holder further includes a bearing portion, the bearing portion is connected to the connecting side of the support portion, and the bearing portion can be bent relative to the support portion.

With reference to the seventh possible implementation, in an eighth possible implementation, the support portion and the rear housing form an integral structure, and the support portion and the bearing portion also form an integral structure.

In a ninth possible implementation, the first magnet group is built in the rear housing, and the second magnet group is built in the holder.

Compared with other approaches, according to the electronic product protective case provided in the present disclosure, a first magnet group is disposed in the rear housing, and a second magnet group is disposed in the holder. The first magnet group includes a first magnet and a third magnet that have opposite polarities, and the second magnet group includes a second magnet and a fourth magnet that have opposite polarities. The first magnet and the second magnet have opposite polarities, and the third magnet and the fourth magnet have opposite polarities. The first magnet and the second magnet are mutually absorbed, and the third magnet and the fourth magnet are mutually absorbed such that the holder is absorbed to a surface of the rear housing. In such a manner of arranging magnets with opposite polarities, directions of magnetic lines of force around the magnets with the opposite polarities are opposite. Therefore, positive and negative magnetic flux in space around the first magnet group and the second magnet group offsets each other. In this way, impact of the first magnet group and the second magnet group on surrounding magnetic induction strength is minimized in order to reduce impact on a magnetic sensitive component in an electronic product.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
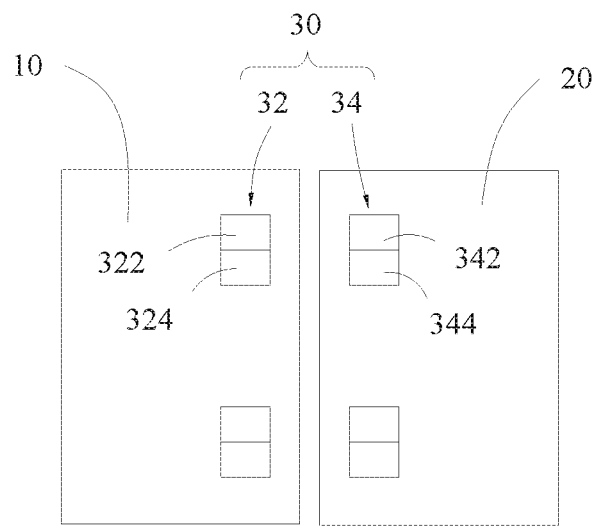
FIG. 1 is a schematic diagram of distribution of a magnet assembly in an electronic product protective case according to an implementation of the present disclosure.
Figure 2:
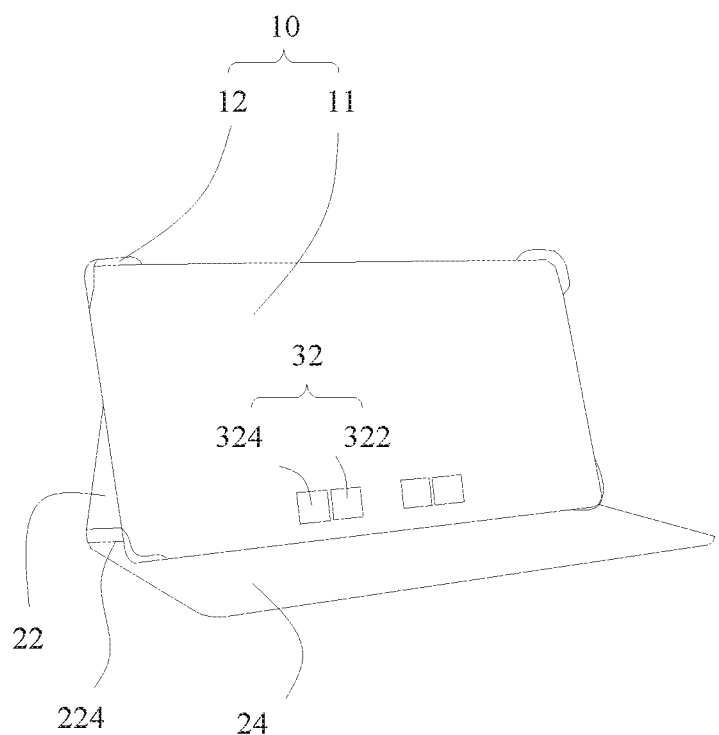
FIG. 2 is a three-dimensional schematic diagram of an electronic product protective case according to an implementation of the present disclosure.
Figure 3:
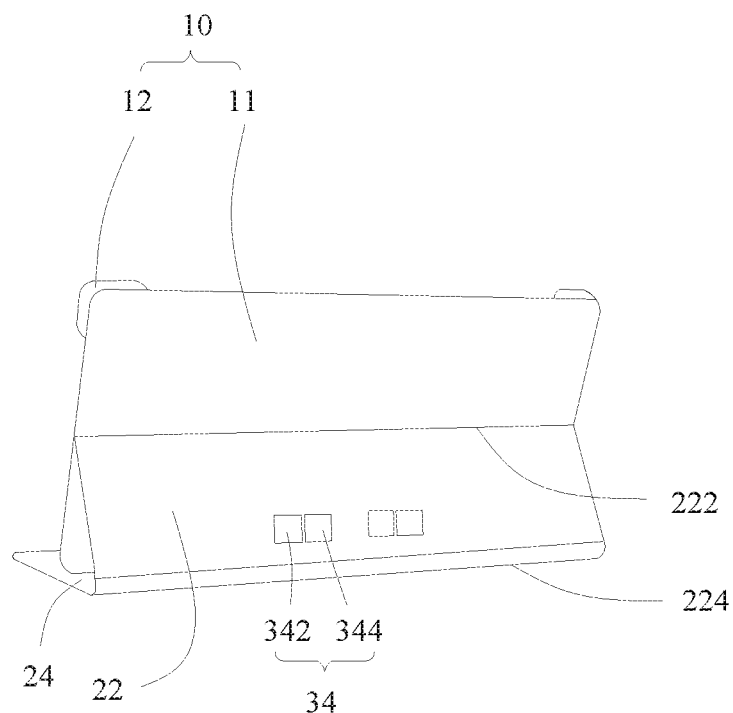
FIG. 3 is a three-dimensional schematic diagram of an electronic product protective case in another direction according to an implementation of the present disclosure.

Referring to FIG. 1, FIG. 2, and FIG. 3, the present disclosure provides an electronic product protective case that is applied to electronic products such as mobile phones and tablets. The electronic product protective case includes a rear housing 10 and a holder 20. The rear housing 10 is configured to cover a rear cover of an electronic product. The holder 20 is connected to the rear housing 10 and is configured to cooperate with the rear housing 10 to support the electronic product. In this implementation, the rear housing 10 includes a main part 11 and frames 12. The frames 12 are disposed on edges of the main part 11. The main part 11 is configured to cover the rear cover of the electronic product, and the frames 12 hold sides of the electronic product in order to install the rear housing 10 on the electronic product. The main part 11 may be flat, or may be arc-shaped. A shape of the main part 11 is the same as a shape of the rear housing 10 of the electronic product, and the two may be pressed against each other. The holder 20 is connected to the main part 11 of the rear housing 10, and the holder 20 and the main part 11 may be an integral structure. For example, the holder 20 and the main part 11 may become integral using a same material (such as leather or polyurethane (PU)). The holder 20 and the main part 11 may also be a separated structure, and the two may be connected in a manner of cooperation between a fastening buckle and a fastening slot, or may be connected using a rotating shaft such that the holder 20 and the main part 11 of the rear housing 10 can be flipped relative to each other.

The electronic product protective case further includes a magnet assembly 30. The magnet assembly 30 includes a first magnet group 32 and a second magnet group 34. The first magnet group 32 is disposed in the rear housing 10, and the second magnet group 34 is disposed in the holder 20. The first magnet group 32 includes a first magnet 322 and a third magnet 324 that have opposite polarities, and the second magnet group 34 includes a second magnet 342 and a fourth magnet 344 that have opposite polarities. The first magnet 322 and the second magnet 342 have opposite polarities, and the third magnet 324 and the fourth magnet 344 have opposite polarities. The first magnet 322 and the second magnet 342 are mutually absorbed, and the third magnet 324 and the fourth magnet 344 are mutually absorbed such that the holder 20 is absorbed to a surface of the rear housing 10. A quantity of the magnet assemblies 30 may be one, or two or more. A specific quantity and distribution may be determined according to an area of the rear housing 10.

According to the electronic product protective case provided in the present disclosure, a first magnet group 32 is disposed in the rear housing 10, and a second magnet group 34 is disposed in the holder 20. The first magnet group 32 includes a first magnet 322 and a third magnet 324 that have opposite polarities, and the second magnet group 34 includes a second magnet 342 and a fourth magnet 344 that have opposite polarities. The first magnet 322 and the second magnet 342 have opposite polarities, and the third magnet 324 and the fourth magnet 344 have opposite polarities. The first magnet 322 and the second magnet 342 are mutually absorbed, and the third magnet 324 and the fourth magnet 344 are mutually absorbed such that the holder 20 is absorbed to a surface of the rear housing 10. In such a manner of arranging magnets with opposite polarities, directions of magnetic lines of force around the magnets with the opposite polarities are opposite. Therefore, positive and negative magnetic flux in space around the first magnet group 32 and the second magnet group 34 offsets each other. In this way, impact of the first magnet group 32 and the second magnet group 34 on surrounding magnetic induction strength is minimized in order to reduce impact on a magnetic sensitive component in an electronic product.

In an implementation, the first magnet 322 and the third magnet 324 are disposed side by side and press against each other, and the second magnet 342 and the fourth magnet 344 are disposed side by side and press against each other. That is, no gap is disposed between the first magnet 322 and the third magnet 324 (as shown in FIG. 1), and no gap is disposed between the second magnet 342 and the third magnet 324 (as shown in FIG. 1). Such a mutually pressing structure with no gap between magnets enables a large offset amount of the positive and negative magnetic flux in the space around the first magnet group 32 and the second magnet group 34 such that the magnetic induction strength is small.

Figure 4:
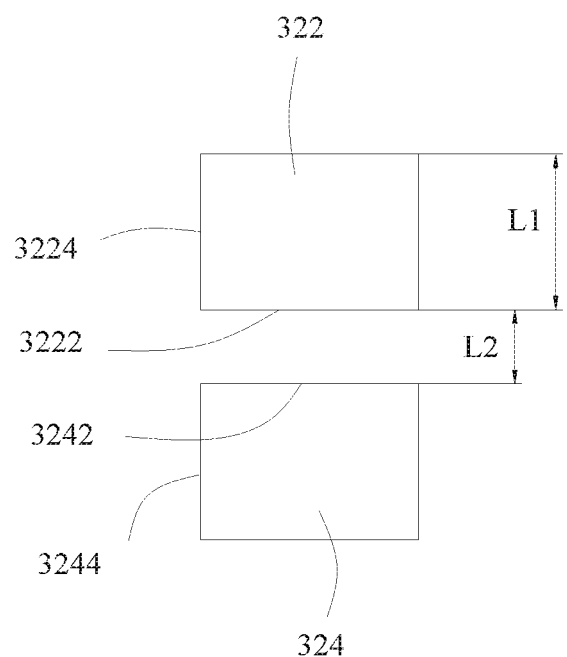
FIG. 4 is a schematic diagram of a location relationship between a first magnet and a third magnet in an electronic product protective case according to an implementation of the present disclosure.

In another implementation, referring to FIG. 4, the first magnet 322 includes a first side 3222 and a second side 3224 that are adjacent, and the first side 3222 is perpendicular to the second side 3224. The third magnet 324 includes a third side 3242 and a fourth side 3244 that are adjacent, and the third side 3242 is perpendicular to the fourth side 3244, and the first magnet 322 and the third magnet 324 are disposed side by side, the first side 3222 is opposite to the third side 3242, the second side 3224 and the fourth side 3244 are extended in a same direction, the second side 3224 and the fourth side 3244 have an equal length, and a distance L2 between the first side 3222 and the third side 3242 is less than or equal to the length L1 of the second side 3224. The second side 3224 and the fourth side 3244 are respectively considered as widths of the first magnet 322 and the third magnet 324, and the first side 3222 and the third side 3242 are respectively considered as lengths of the first magnet 322 and the third magnet 324. Further, the first magnet 322 and the third magnet 324 have an equal length, and also have an equal width. A gap is allowed between the first magnet 322 and the third magnet 324, but a size of the gap cannot exceed the width of the first magnet 322. Installation and positioning of the first magnet 322 and the third magnet 324 in a manufacture process allows the gap. Installation spaces may be reserved in the rear housing 10, and a gap is allowed between the installation spaces, and then the first magnet 322 and the third magnet 324 may be positioned in the installation spaces. However, an excessively large gap affects offset of magnetic flux between two magnets. Therefore, the gap between the first magnet 322 and the third magnet 324 needs to be limited. The size of the gap cannot exceed the width of the first magnet 322, and this is an empirical value obtained from multiple experiments.

In an implementation, a difference between magnetic field strength of the first magnet 322 and magnetic field strength of the third magnet 324 is less than or equal to 300 mT. In a consideration of factors such as a strength difference between magnets, a magnet individual difference (such as a size and a material), and a location of a magnetic sensitive element, magnetic field strength of two magnets is different. A difference of magnetic field strength between two magnets causes different magnetic flux of the two magnets, and therefore the magnetic flux cannot be totally offset. Therefore, the difference between the magnetic field strength of the first magnet 322 and that of the third magnet 324 is limited in the present disclosure (less than or equal to 300 mT).

Optionally, the magnetic field strength of the first magnet 322 is equal to the magnetic field strength of the third magnet 324. Equal magnetic field strength facilitates offset of magnetic flux between magnets. In an implementation, the first magnet group 32 is disposed near a central area of the rear housing 10. In this implementation, the holder 20 and the rear housing 10 may be a separated structure. The holder 20 presses against the central area of the rear housing 10 when the holder 20 is not used. The holder 20 may also be connected to a location near an edge of the rear housing 10. When the holder 20 is not used, the holder 20 is absorbed to the rear housing 10 by means of absorbing between the first magnet group 32 in the central area of the rear housing 10 and the second magnet group 34 in the holder 20.

In another implementation, as shown in FIG. 2 and FIG. 3, the first magnet group 32 is located near an edge of the rear housing 10, the holder 20 includes a support portion 22, the support portion 22 includes a connecting side 222 and a support side 224, the connecting side 222 is connected to the rear housing 10, the support portion 22 can be opened and closed relative to the rear housing 10, the support side 224 is disposed opposite to the connecting side 222, and the second magnet group 34 is located in a location in the support portion 22 near the support side 224.

The holder 20 further includes a bearing portion 24. The bearing portion 24 is connected to the connecting side 222 of the support portion 22, and the bearing portion 24 can be bent relative to the support portion 22.

In an implementation, the support portion 22 and the rear housing 10 form an integral structure, and the support portion 22 and the bearing portion 24 also form an integral structure.

The first magnet group 32 is built in the rear housing 10, and the second magnet group 34 is built in the holder 20. A built-in structure makes the electronic product protective case aesthetic. In another implementation, the first magnet group 32 may also be disposed on a surface of the rear housing 10, and the second magnet group 34 may also be disposed on a surface of the holder 20.

The foregoing is a detailed description of an electronic product protective case provided in the embodiments of the present disclosure. In this specification, specific examples are used to describe the principle and implementations of the present disclosure, and the description of the embodiments is only intended to help understand the method and core idea of the present disclosure. Meanwhile, a person of ordinary skill in the art may, based on the idea of the present disclosure, make modifications relative to the specific implementations and the application scope. Therefore, the content of this specification shall not be construed as a limitation to the present disclosure.

What is claimed is:

1. An electronic product protective case, comprising:
    a rear housing configured to cover a rear cover of an electronic product;
    a holder coupled to the rear housing and configured to cooperate with the rear housing to support the electronic product; and
    a magnet assembly comprising:
        a first magnet group disposed in the rear housing, the first magnet group comprising a first magnet and a third magnet that have opposite polarities; and
        a second magnet group disposed in the holder, the second magnet group comprising a second magnet and a fourth magnet that have opposite polarities, the first magnet and the second magnet having opposite polarities, the third magnet and the fourth magnet having opposite polarities, the first magnet and the second magnet being mutually absorbed, the third magnet and the fourth magnet being mutually absorbed, the holder being absorbed to a surface of the rear housing, the first magnet comprising a first side and a second side that are adjacent, the first side being perpendicular to the second side, the third magnet comprising a third side and a fourth side that are adjacent, the third side being perpendicular to the fourth side, the first magnet and the third magnet being disposed side by side, the first side being opposite to the third side, the second side and the fourth side being extended in a same direction, the second side and the fourth side having an equal length, and a distance between the first side and the third side being less than or equal to a length of the second side.

2. The electronic product protective case of claim 1, wherein a difference between magnetic field strength of the first magnet and magnetic field strength of the third magnet is less than 300 millitesla (mT).

3. The electronic product protective case of claim 2, wherein the magnetic field strength of the first magnet is equal to the magnetic field strength of the third magnet.

4. The electronic product protective case of claim 1, wherein a difference between magnetic field strength of the first magnet and magnetic field strength of the third magnet is equal to 300 millitesla (mT).

5. The electronic product protective case of claim 4, wherein the magnetic field strength of the first magnet is equal to the magnetic field strength of the third magnet.

6. An electronic product protective case, comprising:
a rear housing configured to cover a rear cover of an electronic product;
a holder coupled to the rear housing and configured to cooperate with the rear housing to support the electronic product; and
a magnet assembly comprising:
a first magnet group disposed in the rear housing, the first magnet group comprising a first magnet and a third magnet that have opposite polarities; and
a second magnet group disposed in the holder, the second magnet group comprising a second magnet and a fourth magnet that have opposite polarities, the first magnet and the second magnet having opposite polarities, the third magnet and the fourth magnet having opposite polarities, the first magnet and the second magnet being mutually absorbed, the third magnet and the fourth magnet being mutually absorbed, the holder being absorbed to a surface of the rear housing, the first magnet group being located near an edge of the rear housing, the holder comprising a support portion, the support portion comprising a connecting side and a support side, the connecting side being coupled to the rear housing, the support portion being configured to open relative to the rear housing, the support side being disposed opposite to the connecting side, and the second magnet group being located in a location in the support portion near the support side.

7. The electronic product protective case of claim 6, wherein the holder further comprises a bearing portion, the bearing portion being coupled to the connecting side of the support portion, and the bearing portion being configured to bend relative to the support portion.

8. The electronic product protective case of claim 7, wherein the support portion and the rear housing form an integral structure, and the support portion and the bearing portion form another integral structure.

9. An electronic product protective case, comprising:
a rear housing configured to cover a rear cover of an electronic product;
a holder coupled to the rear housing and configured to cooperate with the rear housing to support the electronic product; and
a magnet assembly comprising:
a first magnet group disposed in the rear housing, the first magnet group comprising a first magnet and a third magnet that have opposite polarities; and
a second magnet group disposed in the holder, the second magnet group comprising a second magnet and a fourth magnet that have opposite polarities, the first magnet and the second magnet having opposite polarities, the third magnet and the fourth magnet having opposite polarities, the first magnet and the second magnet being mutually absorbed, the third magnet and the fourth magnet being mutually absorbed, the holder being absorbed to a surface of the rear housing, the first magnet group being located near an edge of the rear housing, the holder comprising a support portion, the support portion comprising a connecting side and a support side, the connecting side being coupled to the rear housing, the support portion being configured to close relative to the rear housing, the support side being disposed opposite to the connecting side, and the second magnet group being located in a location in the support portion near the support side.

10. The electronic product protective case of claim 9, wherein the holder further comprises a bearing portion, the bearing portion is coupled to the connecting side of the support portion, and the bearing portion is configured to bend relative to the support portion.

11. The electronic product protective case of claim 10, wherein the support portion and the rear housing form an integral structure, and the support portion and the bearing portion form another integral structure.

* * * * *

UNITED STATES PATENT AND TRADEMARK OFFICE
CERTIFICATE OF CORRECTION

PATENT NO. : 10,164,678 B2
APPLICATION NO. : 15/560409
DATED : December 25, 2018
INVENTOR(S) : Xiaokun Wang, Wujian Liu and Yanbiao Luo It is certified that error appears in the above-identified patent and that said Letters Patent is hereby corrected as shown below:

In the Specification

Column 1, CROSS-REFERENCE TO RELATED APPLICATION, Line 3: "in its entire" should read "in its entirety"

Signed and Sealed this
Twenty-sixth Day of February, 2019

Andrei Iancu
*Director of the United States Patent and Trademark Office*